United States Patent Office 3,450,027
Patented June 17, 1969

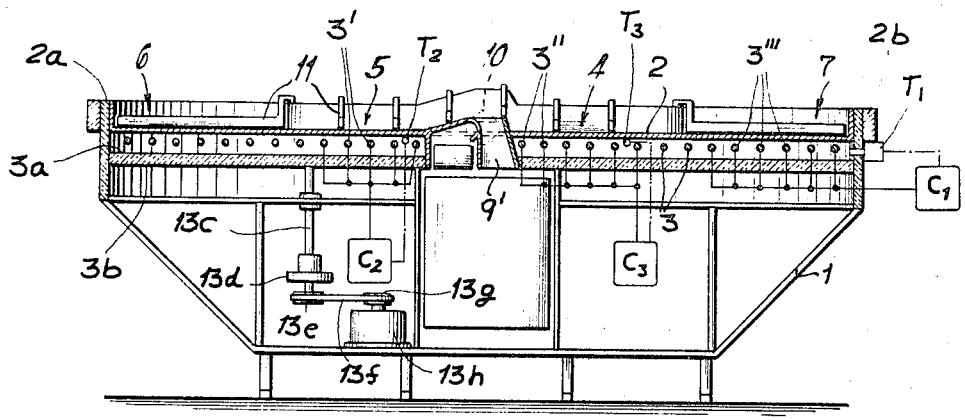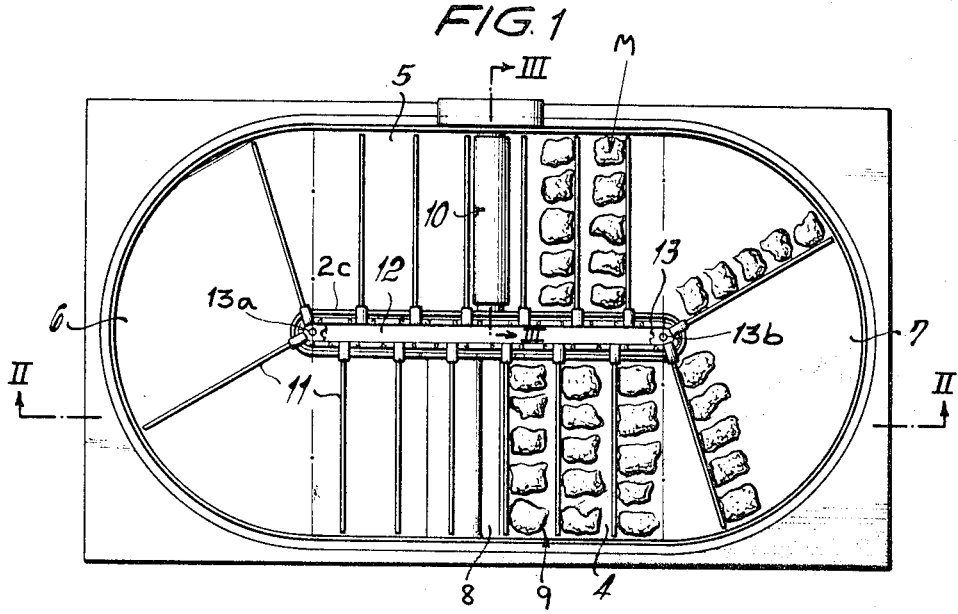

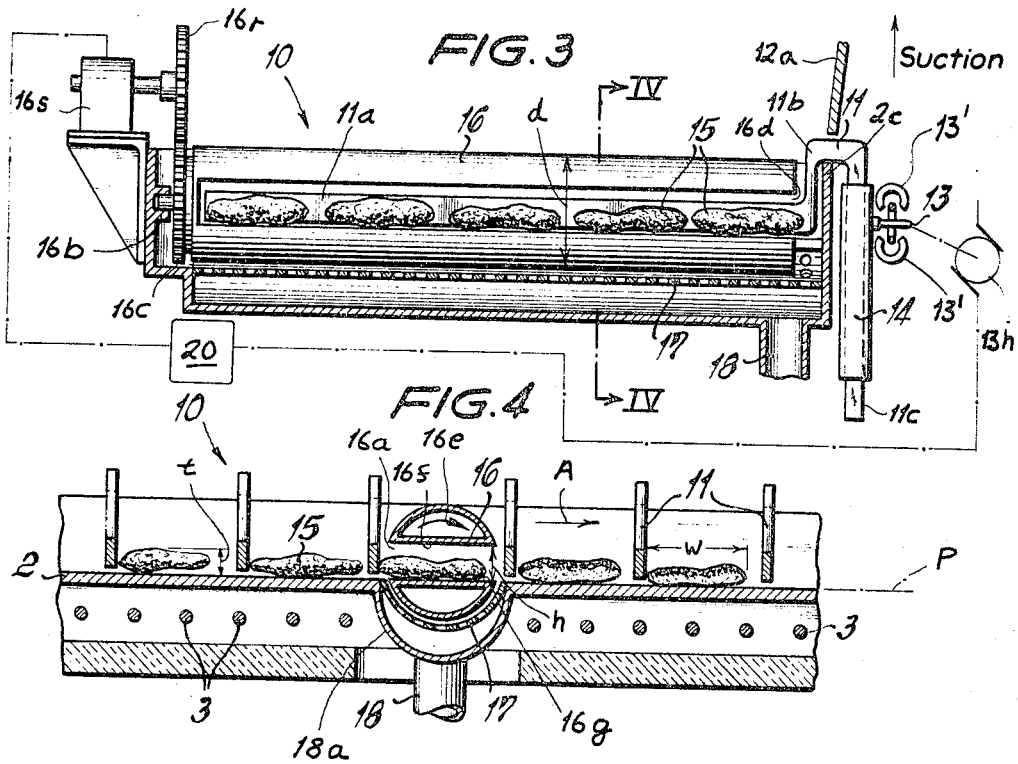
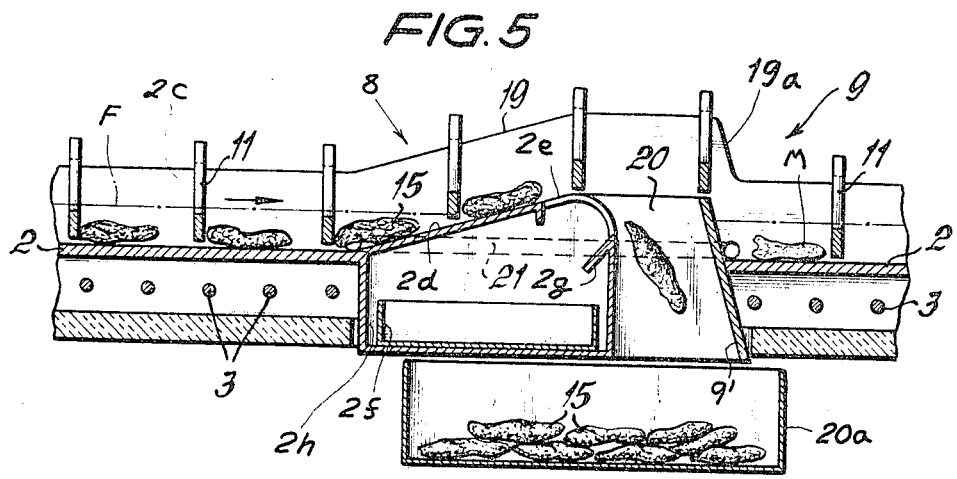
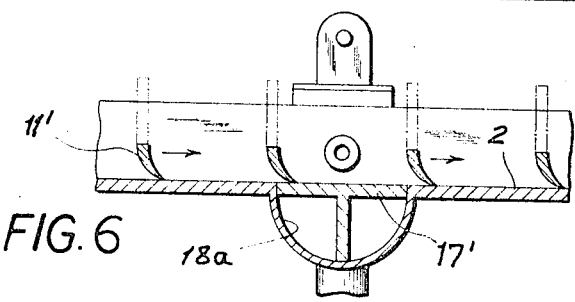

3,450,027
APPARATUS FOR THE FRYING AND ROASTING OF COMESTIBLES
Alfred Lohr and Helmut Hemmann, Herborn, and Karl Tropp, Werdorf, Germany, assignors to Burger Eisenwerke Aktiengesellschaft, Wetzlar, Germany, a corporation of Germany
Filed May 23, 1967, Ser. No. 640,535
Claims priority, application Germany, May 25, 1966, 87,280
Int. Cl. A47j 37/10
U.S. Cl. 99—423     13 Claims

ABSTRACT OF THE DISCLOSURE

Apparatus for the serial frying or roasting of comestibles in which pieces of meat or the like are drawn along an endless annular transport path by a plurality of pusher arms or flights cantilevered at one side of this path, extending athwart the latter, and continuously entrained around this path; the roasting or frying surface is subdivided into two generally straight sections joined at their ends by a pair of semicircular sections to import a generally elliptical configuration to the path. Approximately midway along one of these sections, an exit ramp is provided for discharging the roasted objects and, substantially midway along the other straight section, a turning device flips over the pieces of meat. The flights are entrained by a chain and are vertically shiftable to enable them to follow the ramp and to discharge the meat over a fat-collection pan through an outlet opening across the transport path into a receptacle, uncooked meat being placed on the path for engagement by the continuously moving flights just ahead of this opening.

---

Our present invention relates to an apparatus for the serial frying or roasting of a succession of flat comestible items, especially pieces of meat, in which the meat is drawn along a heated surface and, more particularly, to a system for the roasting of such pieces along both surfaces.

While it has already been proposed to carry out serial roasting or frying of meat over a heated generally horizontal surface by moving the meat therealong, it has been the practice in such systems to convey the objects to be roasted or fried along a continuous transport path between an input end and a remote discharge end by moving grills, spits, baskets and the like, thereby necessitating complex conveying means, drive mechanisms and housing structures. In the cooking of meat at elevated temperatures, these complexities are increased by the need for protecting the moving parts against accumulation of fat, grease and the thermal-degradation products araising from the cooking fats and juices.

It is, therefore, the principal object of the present invention to provide an improved apparatus for the roasting, frying and broiling of flat comestible pieces whereby the disadvantages of earlier systems are obviated.

Another object of this invention is to provide an improved apparatus of the character described in which, with relatively simple conveying means, discharge means and turning means, it is possible to roast meat, e.g. patties, cutlets and the like, on both sides without damaging the comestibles and with a minimum of disruption in the process.

Still another object of this invention is to provide an apparatus for carrying out the roasting of meat patties and like comestible articles on both sides whereby the apparatus is free from empty conveyor passes.

In our commonly assigned, concurrently filed copending application Ser. No. 640,532 entitled "Serial Roasting Apparatus With Product Turner," we describe and claim an apparatus for the serial roasting of flat comestible objects, e.g. meat patties, fillets and the like, cutlets, like flat cuts of meat, in which the pieces of the comestible are drawn along a roasting surface heated from below and are turned at substantially the half-way point in their movement therealong by a turning device in the form of a drum jornaled at one end at one side of the apparatus and the continuous transport path. This drum or turning shaft has a throughgoing longitudinal slot extending diametrically therethrough and opens at the other end and side of the transport path, while the conveying means is formed by a chain-driven succession of flights which are cantilevered at the side of the apparatus and transport path proximal to the open end of the drum and remote from the driven end thereof; these flights thus pass diametrically through the drum to carry rows of pieces of meat, previously roasted on one side, into the drum; the movement of the flights, which is intermediate and preferably periodic, is then terminated while the periodically operating drum is rotating between each movement of the flights through a half revolution to flip over the rows of objects therein. The drum is then immobilized and the flights advanced by a distance equal substantially to the distance between the rows of meat pieces to shift a turned row out of the drum and onto the roasting surface for cooking along their other surfaces, while a successive row of patties is drawn or pushed into the drum. The flights are displaced by an intermittently moving chain propelled synchronously with the gear drive at the supported end of the intermittently operable drum to halt the flights when the drum is rotated. Thus the drum and the flights are alternately actuated.

We have now found that it is possible to carry out serial roasting and/or frying of flat pieces of meat or the like without the disadvantages of prior-art systems and in an apparatus of relatively small overall dimensions, even though the cooking process may require a relatively long period, by orienting the generally horizontal roasting plate or surface in an endless horizontal annular transport path surrounding an upright axis and, preferably, in a generally elliptical configuration. Thus, the transport path and the roasting plate can have, according to an important feature of this invention, a pair of transversely spaced parallel straight portions joined at the end of the apparatus by semicircular or sectoral portions preferably integral with the roasting plate. Approximately midway along one of these straight sections, we provide an ascending ramp adapted to lead the pieces of roasted meat upwardly to a discharge opening extending across the path between the rap and an input portion of the device at which fresh meat is placed upon the roasting surface. The flights or pusher members, whose arms extend parallel to one another but are spaced apart in the direction of advance of the conveyor, are connected with a chain drive so as to enable them to rise upwardly and downwardly along the roasting surface and thereby follow the ramp upwardly while urging pieces of meat therealong.

At the input portion of the apparatus, the flights descend to engage fresh rows of meat and entrain them along the endless transport path. Advantageously, a collecting receptacle is disposed below the discharge opening and, between the discharge opening and the terminal roasting portion of the transport path, a grill, grillwork, lattice, screen or perforated plate is provided as part of the ramp to drain fats and other juices formed during roasting onto a collecting trough or pan.

On the opposite side of the apparatus, i.e. midway along the other straight portions of the transport pan, we provide a turning means which preferably is of the type described in the aforementioned copending application. When the apparatus is employed for frying and includes a housing forming a fat-retaining trough with the heated plate, we prefer to provide a duct connecting the trough portions on either side of the ramp a discharge opening, which lies above the level of cooking fat therein, to equalize the level sustained on either side of the trough.

The sections of the heating plate are, moreover, independent from one another and provided with respective heating elements which, advantageously, underlie the heating plate between the latter and a wall of ceramic refractory material, the heating elements for the discrete plate sections being thermostatically controlled individually. In this case, the greatest heating is effected in the region of the discharge ramp for greater searing and browning. The turning device may, moreover, be interchangeable for pieces of meat of different width, or may be replaced entirely by a flat plate contiguous with the heating surfaces.

The above and other objects, features and advantages of this invention will become more readily apparent from the following description, reference being made to the accompanying drawing in which:

FIG. 1 is a plan view of an apparatus embodying the present invention;

FIG. 2 is a cross-sectional view taken generally along the line II—II of FIG. 1;

FIG. 3 is an enlarged cross-sectional view taken generally along the line III—III of FIG. 1 and illustrating the turning device;

FIG. 4 is a cross-sectional view taken along the line IV—IV of FIG. 3;

FIG. 5 is a detail view of the discharge portion of the device as seen in FIG. 2; and FIG. 6 is a cross-sectional view similar to FIG. 4 in which the turning device has been removed and the conveyor means have been in part replaced by scrapers in accordance with other features of this invention.

In FIGS. 1 and 2 of the drawing, we show an apparatus for the serial roasting and/or frying of a series of pieces of flat meat arrayed in rows M extending transversely of a roasting or frying surface 2 which forms, with a wall 2a, a fat-retaining trough whenever the device is employed for frying. Spaced below the heated surface 2, which is mounted upon the support frame 1, there is provided an array of spaced-apart parallel electric-resistance heaters 3 which are received in a compartment 3a defined between the surface 2 and a wall 3b of heat-resistant ceramic material. The outer housing wall 2a, which is reinforced by a peripheral ring 2b, likewise may be of a heat-resistant material.

The heated surface 2 define an annular, endless, generally elliptical transport path which can be viewed as having a pair of relatively straight portions 4 and 5 which are parallel to one another but transversely spaced and are joined by a pair of semi-circular portions 6 and 7 connecting the ends of the straight portions 4 and 5. Approximately midway along the straight portion 4, we provide a discharge station 8 which is illustrated in greater detail in FIG. 5, ahead of which is located the input station 9 at which the flat servings 15 of meat are placed upon the surface 2. On the opposite side of the apparatus and substantially midway along the straight portion 5 of the transport path, we provide a turning station generally designated 10 and constituted as described in the aforementioned copending application and illustrated in greater detail in FIGS. 3, 4 and 6.

Centrally disposed in a clearance 12 between the sections 4 through 7, and surrounded thereby, an endless chain 13 is passed about sprockets 13a and 13b and is driven by a shaft 13c via a clutch 13d, a driven pulley 13e, a belt 13f and the driving pulley 13g of an electric motor 13h. Above the clearance 12, there is provided a suction hood 12a to draw contaminants, dust and the like away from the drive mechanism.

The conveying means includes vertically extending sleeves 14 (FIG. 3) spaced along the chain 13 and entrained thereby along the inner side of the transport path, the chain 13 running between guide channels 13' which are, for illustrative purposes, shown to be spaced from the chain but in reality hug the latter to prevent twisting thereof. A flight, generally designated 11, constitutes a pusher for each row M of articles to be roasted and, accordingly, has a horizontal arm 11a extending toward the transport path and cantilevered by a shank 11b turned about the wall 2b, to a leg 11c which is vertically shiftable within the respective sleeve 14. The flights or pushers 11 thus sweep the products along the heated surface 2 under the control of the chain. The sleeve 14 and the leg 11c are of mating prismatic configuration to permit vertical movement of the flights without relative rotary movement of sleeve and flight. The flights 11 can be replaced for cleaning by simply lifting them from the respective sleeve 14 and are easily interchangeable with, for example, pusher members of other configuration or scrapers 11' (FIG. 6) designated to clear the surface 2 from any accumulated wastes.

At the discharge station 8, the flights 11 ascend a ramp 19 forming a guide surface on the inner wall 2c which parallels the ramp 2d ascending from the heating surface 2 as illustrated in FIG. 5. The wall 2c advantageously serves to retain the arm 11a of each flight 11 slightly above the heated surface 2. The ramp 2d extends above the level of cooking fat F maintained within the trough when deep frying is carried out. Ramp 2d, moreover, terminates at its upper end in a grill 2e at which excess fat and juices are drained into a collecting pan 2f via an apron 2g, this collecting pan being connected by suitable ductwork with the pipe 18 described in greater detail hereinafter. Alternatively, the pan 2f may be removably positioned in a compartment 2h for emptying when full. At the discharge sides of the ramp 2d, 2e, there is provided a discharge opening 20 extending across the transport path and formed by a chute 9' which discharges the pieces 15 of meat, after they have been roasted on both sides, into a collecting tray 20a. Forwardly of the opening 20, the flight-control surface 19 of the wall 2c has a descending flank 19a which brings the flights 11 downwardly behind each row M of fresh meat to be advanced along the transport path.

After the pieces of meat have been roasted along one side, they enter the turning station 10 at which they are flipped over turned for roasting or frying on their other side. At this roasting station, the roasting plate 2 (FIGS. 3 and 4) is integral with a semicylindrical collection trough 18a into which a perforated or wire-screen semicylindrical sieve 17 is recessed below the plane P of the roasting plate 2. The perforated guide surface 17, which closely hugs the periphery of the turning drum 16, is coaxial therewith and is centered upon its axis X.

The turning drum or shaft 16 is formed with a diametrical slot 16a and has a diameter $d$ approximately equal to or slightly greater than the width $w$ of the pieces. The axial height $h$ of the slot 16a exceeds the thickness $t$ of the pieces 15 passing therethrough. As can be seen from FIG. 3, the shaft or drum 16 is journaled at 16b, i.e. its end remote from that at which the arms 11a are supported, in the housing wall 2b defined in the other side (outer) of the transport path. A driven gear 16c connected with this end of the drum 16 meshes with a driving gear 16r of a motor 16s to rotate the drum 16 in the direction of arrow 16e. The slot 16a is, moveover, open axially at 16d to permit the arms 11a and their shanks 11b to pass through and beyond the drum 16. The drum 16 is hollow to reduce its inertia and momemtum and define the slot 16a between a pair of walls 16f and 16g, which alternately support the meat upon every half revolution of the drum 16. When these surfaces are respectively lowermost, they lie in the plane P of the roasting surface 2.

A programmer 20 is coupled with the motors 16s and 13h for synchronous operation of the drum 16 and the flights 11. Thus the flights 11 are intermittently advanced in the direction of arrow A along the plate 2 to roast the underside of the meat patties 1 by contact with the heated surface 2 on the left-hand side of the turning drum 16 (FIG. 4). The intermittent movement of the chain 13 and the flights 11 is timed to occur only if the drum 16 is stationary, and between each advance of flights 11, a half revolution is imparted to the drum about its axis in the clockwise direction (arrow 16e in FIG. 4).

The rotation of the drum 16 permits the perforated guide plate 17 to support the meat as the drum swings through an upright position of the slot 16a to flip the meat over onto its other side, the drum being then immobilized for the next advance of the flights 11 to remove each row M of meat in succession from the drum and place it upon the surface 2 downstream or ahead of this drum (right-hand side of drum 15 in FIG. 4), simultaneously, as flights 11 advance the next row of meat into the drum. As the drum sweeps through each half revolution when a roasting is to be carried out, the fat and juices along the surface of the meat flow through the perforated plate 17, are collected in the trough 18a and are led away through the duct 18. When frying is to be carried out, the perforated plate 17 can be replaced by a nonperforated shell to prevent draining of the cooking fat. When turning of the meat is to be avoided, the drum 16 is removed (FIG. 6), the perforated guide plate 17 is withdrawn, and a nonperforated metallic plate 17', contiguous and coplanar with the surface 2, is inserted to cover the trough 18a.

To ensure equalization of the levels of fat on either side of the outlet 20 and the ramps 2d and 2e, we provide a duct 21 communicating between the portions of the trough on the opposite sides of the discharge station. To facilitate rapid roasting of the meat, we have found it to be advantageous to provide the greatest heat effect just ahead of the discharge station 8 and, for this purpose, the heaters 3' in this region are set via the thermostat $T_2$ and the controller $C_2$ at a higher heat output than, for example, the heating elements 3" which are controlled by the thermostats $T_3$ and $C_3$. Uniform browning of the product during the remainder of its passage along the heating surface 2 and in spite of the fact that the outermost pieces sweep more rapidly around the bent portions 6 and 7 of the transport path, is ensured by grouping the heaters in zones as represented at 3" and 3'" and controlled by respective thermostats $T_1$ and $T_3$ and controllers $C_1$ and $C_3$ whereby the individual sections 4 through 7 are heated independently from one another and thermostatically controlled in an individual manner.

The invention described and illustrated is believed to admit of many modifications within the ability of persons skilled in the art, all such modifications being considered within the spirit and scope of the appended claims.

We claim:
1. An apparatus for the serial roasting and frying of comestibles comprising, in combination:
a heated, substantially horizontal surface defining an annular transport path;
conveyor means including a plurality of flights successively sweeping along said path for transporting successive pieces of the comestible therealong, said surface and said transport path being formed with a pair of mutually spaced parallel straight sections and a pair of arcuate sections interconnecting said straight sections at the end thereof;
a discharge station located substantially midway along one of straight sections for removing the pieces from said surface, and a turning station opposite said discharge station and disposed substantially midway along the other of said straight sections for turning the pieces prior to further advance thereof along said surface, said discharge station including an upwardly extending ramp constituting a continuation of said surface and a discharge opening provided at the top of said ramp, said flights being so constructed and arranged as to ascend said ramp and carry said pieces therealong.

2. The apparatus defined in claim 1 wherein said conveyor means includes a chain surrounded by said transport path and means for removably attaching said flights to said chain.

3. An apparatus for the serial roasting and frying of comestibles comprising, in combination:
a heated, substantially horizontal surface defining an annular transport path;
conveyor means including a plurality of flights successively sweeping along said path for transporting successive pieces of the comestible therealong, said surface and said transport path being formed with a pair of mutually spaced parallel straight sections and a pair of arcuate sections interconnecting said straight sections at the end thereof;
a discharge station located substantially midway along one of said straight sections for removing the pieces from said surface, and a turning station opposite said discharge station and disposed substantially midway along the other of said straight sections for turning the pieces prior to further advance thereof along said surface, said conveyor means including a chain surrounded by said transport path and means for removably attaching said flights to said chain; and
a scraper interchangeable with at least one of said flights and displaceable with said chain for cleaning said surface.

4. The apparatus defined in claim 3, further comprising a hood overlying said chain for drawing contaminants from the region thereabove.

5. The apparatus defined in claim 3, further comprising heating means individual to said sections for independently controlling the temperatures of said surface thereat.

6. The apparatus defined in claim 3, wherein said flights each have an arm extending toward said transport path and supported only along the inner periphery of said transport path, said turning means comprising a drum rotatably supported at the outer periphery of said transport path and provided with a throughgoing diametrical slot adapted to receive the comestible pieces in succession as they are advanced along said path, and means for synchronizing the rotation of said drum with said conveyor means for advancing the pieces between rotary movement of said drums to shift turned pieces out of said drum and bring other pieces into the latter prior to a further rotary movement of the drum.

7. The apparatus defined in claim 6 wherein said slot opens longitudinally at the inner periphery of said path whereby said arms pass through said drum in a stationary condition thereof, said slot having a supporting wall for the pieces of the comestible received therein and coplanar with said surface upon each half revolution of said drum, said turning means further comprising a perforated semicircular guide member closely hugging and coaxial with said drum while underlying same for guiding the comestible pieces rotatably entrained by said drum as said slot sweeps over said guide member, and a fat-collecting trough underlying said guide member for collecting liquids passing therethrough.

8. An apparatus for the serial roasting and frying of comestibles comprising, in combination:
a heated, substantially horizontal surface defining an annular transport path;
conveyor means including a plurality of flights successively sweeping along said path for transporting successive pieces of the comestible therealong, said surface and said transport path being formed with a pair of mutually spaced parallel straight sections and a pair of arcuate sections interconnecting said straight sections at the end thereof;
a discharge station located substantially midway along one of said straight sections for removing the pieces from said surface, and a turning station opposite said discharge station and disposed substantially midway along the other said straight sections for turning the pieces prior to further advance thereof along said surface, said conveyor means including a chain surrounded by said transport path and means for removably attaching said flights to said chain, said discharge station being provided with an opening spaced above said surface and extending across said path, and a ramp rising from said surface to said opening, said arms being vertically shiftable relative to said surface for following the inclination of said ramp; and means for returning said arms to a position proximal to said surface upon said arms clearing said opening.

9. The apparatus defined in claim 8, further comprising wall means forming with said surface a fat-retaining trough, through which said pieces are displaced and duct means connecting portions of said trough on opposite sides of said opening for equalizing the fat levels therein.

10. The apparatus defined in claim 8, further comprising heating means individual to said sections for independently controlling the temperatures of such surface thereat.

11. The apparatus defined in claim 8, further comprising a hood overlying said chain for drawing contaminants from the region thereabove.

12. The apparatus defined in claim 8 wherein said flights each have an arm extending toward said transport path and supported only along the inner periphery of said transport path, said turning means comprising a drum rotatably supported at the outer periphery of said transport path and provided with a throughgoing diametrical slot adapted to receive the comestible pieces in succession as they are advanced along said path, and means for synchronizing the rotation of said drum with said conveyor means for advancing the pieces between rotary movement of said drums to shift turned pieces out of said drum and bring other pieces into the latter prior to a further rotary movement of the drum.

13. The apparatus defined in claim 12 wherein said slot opens longitudinally at the inner periphery of said path whereby said arms pass through said drum in a stationary condition thereof, said slot having a supporting wall for the pieces of the comestible received therein and coplanar with said surface upon each half revolution of said drum, said turning means further comprising a perforated semi-circular guide member closely hugging and coaxial with said drum while underlying same for guiding the comestible pieces rotatably entrained by said drum as said slot sweeps over said guide member, and a fat-collecting trough underlying said guide member for collecting liquids passing therethrough.

References Cited

UNITED STATES PATENTS

| 2,078,641 | 4/1937 | Spencer | 99—427 XR |
| 2,088,946 | 8/1937 | Carpenter | 99—405 XR |
| 2,107,325 | 2/1938 | Carpenter | 99—405 XR |
| 2,191,284 | 2/1940 | Morris | 99—405 XR |
| 2,225,068 | 12/1940 | Marriott | 99—349 |
| 2,549,283 | 4/1951 | Ashton | 99—408 |
| 2,607,283 | 8/1952 | Crank. | |
| 2,614,485 | 10/1952 | Sinkwitz et al. | 99—404 |
| 2,843,037 | 7/1958 | Waas | 99—423 |
| 3,329,081 | 7/1967 | Roth | 99—405 |
| 3,380,377 | 4/1968 | Alexander | 99—423 |

WALTER A. SCHEEL, *Primary Examiner.*

JOHN M. NEARY, *Assistant Examiner.*

U.S. Cl. X.R.

99—404, 407, 409, 443, 386